April 19, 1966      R. F. CAHILL      3,246,906
VEHICLE SUSPENSION APPARATUS
Filed April 30, 1963      3 Sheets-Sheet 1
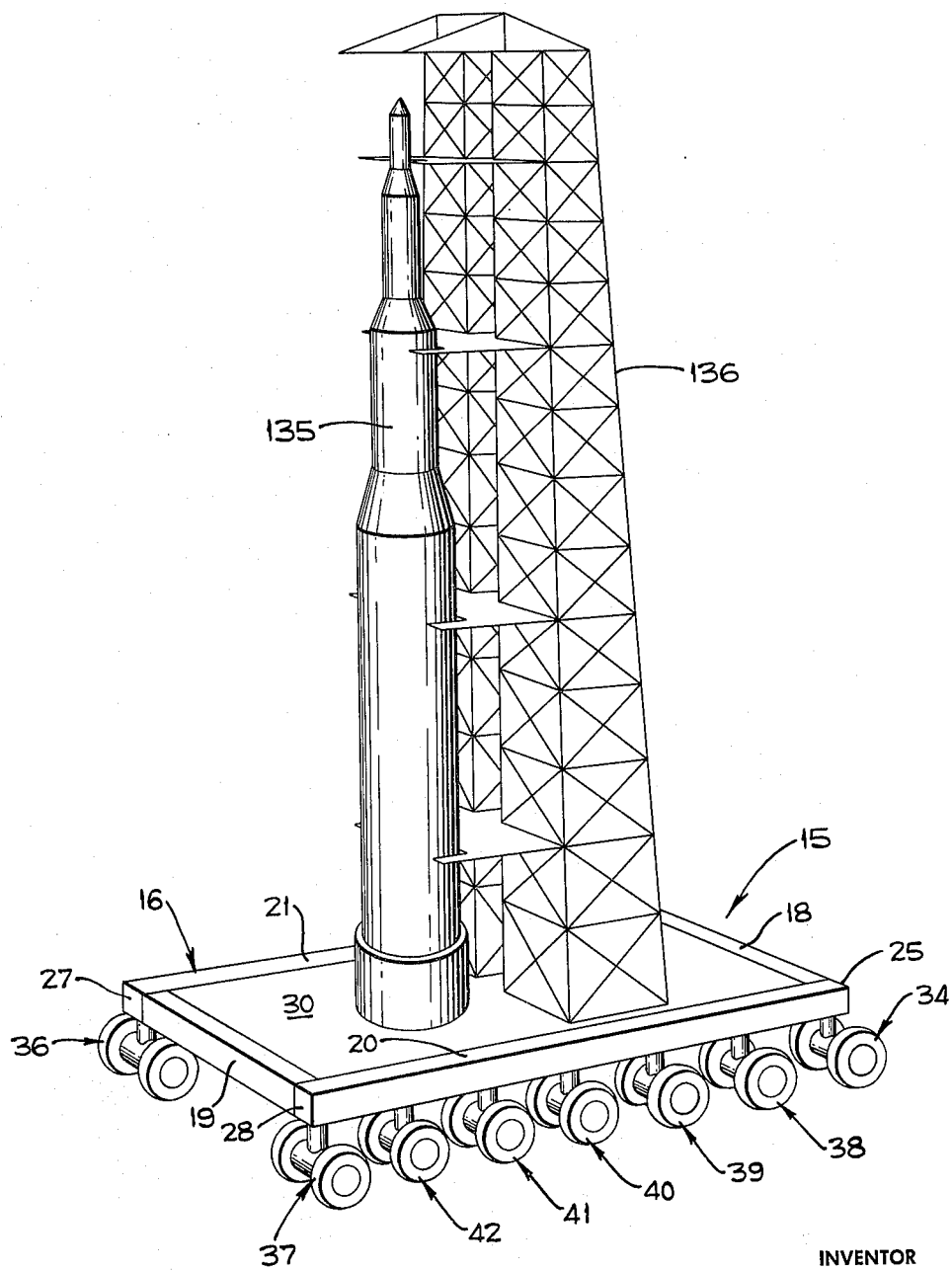
INVENTOR
ROBERT F. CAHILL
BY *Hans G. Hoffmeister*
ATTORNEY April 19, 1966          R. F. CAHILL          3,246,906
VEHICLE SUSPENSION APPARATUS
Filed April 30, 1963          3 Sheets-Sheet 2
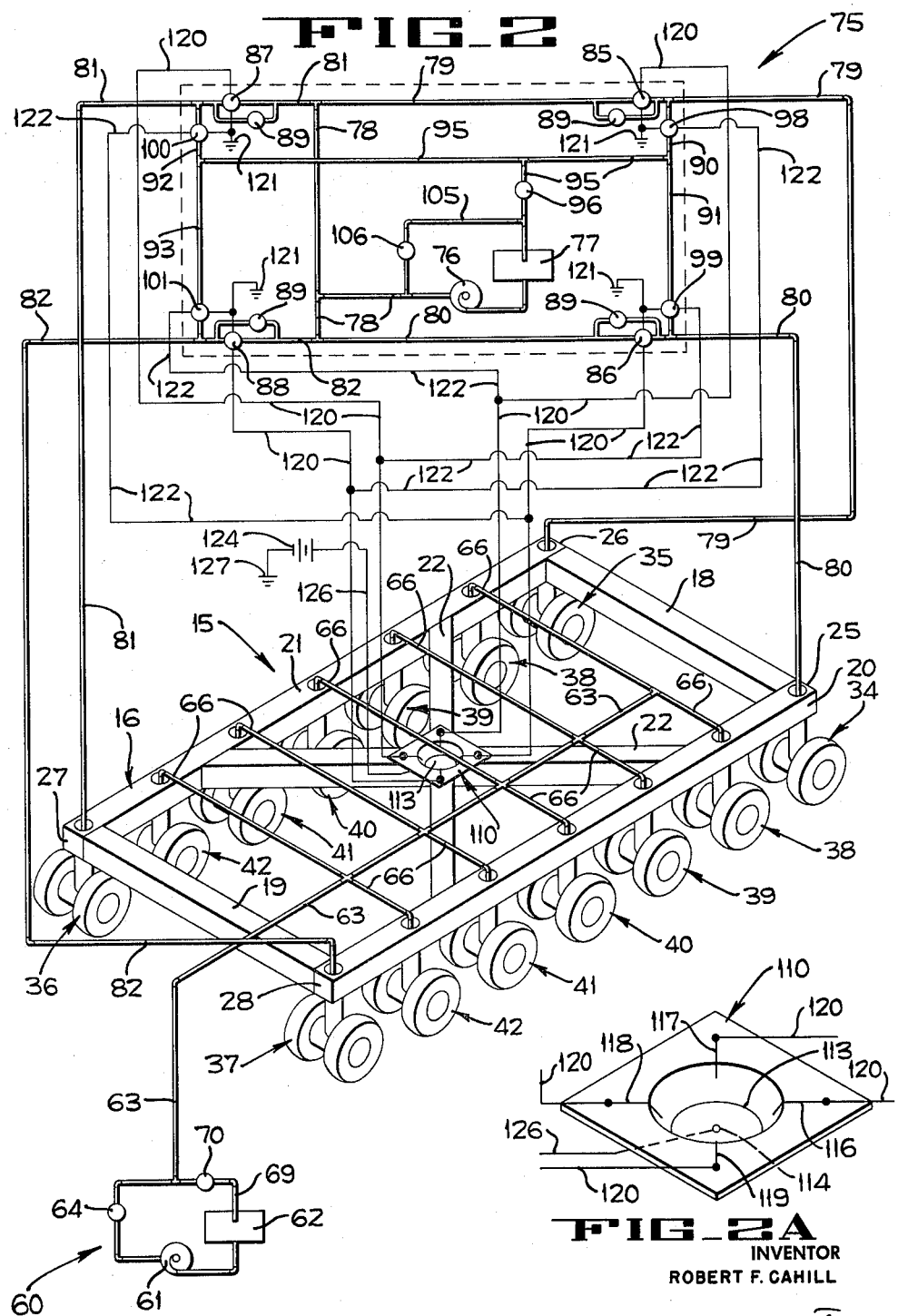
INVENTOR
ROBERT F. CAHILL
BY *Hans G. Hoffmeister*
ATTORNEY April 19, 1966  R. F. CAHILL  3,246,906
VEHICLE SUSPENSION APPARATUS
Filed April 30, 1963  3 Sheets-Sheet 3
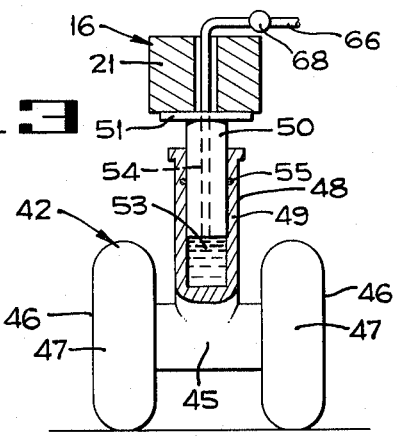
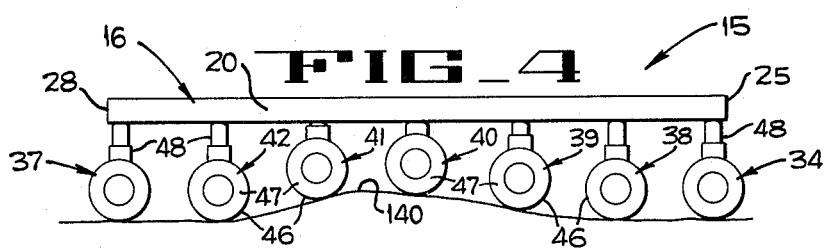
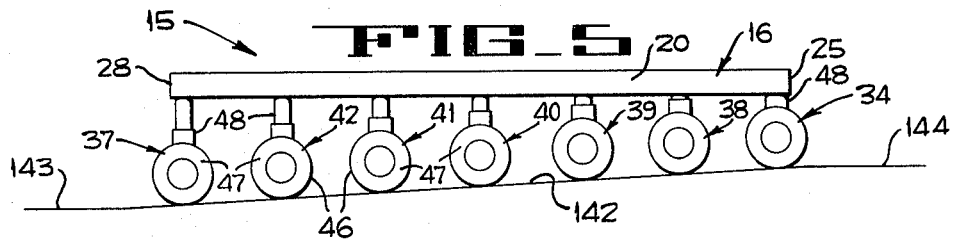
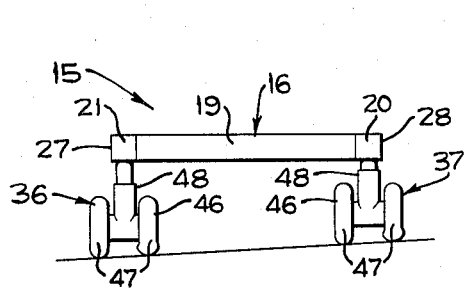
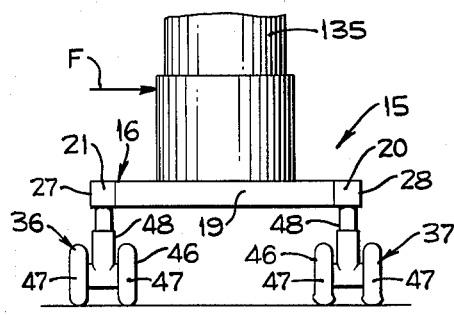
INVENTOR
ROBERT F. CAHILL
BY Hans G. Hoffmeister
ATTORNEY

United States Patent Office 3,246,906
Patented Apr. 19, 1966

3,246,906
VEHICLE SUSPENSION APPARATUS
Robert F. Cahill, Los Altos, Calif., assignor to FMC Corporation, San Jose, Calif., a corporation of Delaware
Filed Apr. 30, 1963, Ser. No. 276,957
8 Claims. (Cl. 280—6.1)

The present invention pertains to an apparatus for suspending a load carrying platform on wheels and, more particularly, to a vehicle suspension apparatus that distributes the load in an optimum manner on the wheels of the vehicle and automatically levels the platform which carries the load.

The apparatus of the present invention is especially useful for vehicles capable of transporting loads that are massive both in size and weight. Such a load might be a space rocket, measuring several hundred feet in height and weighing millions of pounds. Many problems are involved in the transportation of such loads, but the present invention is concerned primarily with the problem of suspending the load on wheels in order to achieve certain desirable objectives. Although the invention is specifically disclosed for use in carrying rockets and associated equipment, it will be understood as the description proceeds that it has broader utility for vehicles capable of carrying other loads.

It is an object of the present invention to provide an apparatus for suspending a load carrying platform on wheels.

Another object is to provide a vehicle suspension apparatus that distributes the load in an optimum manner on the wheels of the vehicle.

Another object is to provide a vehicle suspension apparatus that automatically levels the load carrying platform.

Another object is to provide a vehicle suspension apparatus that achieves maximum utilization of tire capacity.

Another object is to provide a vehicle suspension apparatus that enables controlled reaction to dynamic forces such as those resulting from wind, acceleration or deceleration, and traveling around curves.

Another object is to provide a vehicle suspension apparatus that operates as a jack to raise or lower the platform for loading or unloading purposes.

These, together with other objects, will become apparent upon reference to the following description and accompanying drawings, in which:

FIGURE 1 is a diagrammatic perspective of a vehicle incorporating the suspension apparatus of the present invention and of a space rocket and its umbilical tower supported on the vehicle.

FIGURE 2 is a diagrammatic view of the load supporting and leveling systems of the subject apparatus and shows how these systems are connected to wheeled suspension units of the vehicle.

FIGURE 2A is an enlarged view of a portion of FIGURE 2.

FIGURE 3 is a detail view, partly in front elevation and partly in vertical section, of one of the wheeled suspension units of the vehicle.

FIGURES 4, 5, 6 and 7 are diagrammatic views of the vehicle of FIG. 1 and illustrate various conditions of operation of the vehicle.

With reference to FIGS. 1 and 2, the subject suspension apparatus is incorporated in a vehicle, generally identified by the numeral 15. As illustrated, the vehicle includes a rectangular frame 16 having front and rear end members 18 and 19, right and left side members 20 and 21, and cross members 22 rigidly interconnecting the side members. The designation of the side members as being "right" and "left" is arbitrary and for the purpose of reference in the subsequent description. The end and side members meet respectively in a right front corner 25, a left front corner 26, a left rear corner 27, and a right rear corner 28. Furthermore, the vehicle includes a platform or deck 30 supported on the frame. It is to be understood that the invention is not limited to the described construction of the vehicle; in fact, the vehicle construction is purposely shown in simplified, diagrammatic form so as to emphasize the features of the suspension apparatus that embody the principles of the present invention.

The vehicle 15 includes front and rear, wheeled corner suspension units 34, 35, 36 and 37 under the corners 25, 26, 27 and 28 of the frame 16, and wheeled intermediate suspension units 38, 39, 40, 41 and 42 under each side member 20 and 21 of the frame 16. It is to be noted that although only one row of seven suspension units under each side of the frame is shown in the illustrated embodiment, three rows of twelve suspension units under each side of the frame would be employed in transporting a gross weight of approximately fifteen million pounds; stated otherwise, FIG. 2 shows only fourteen units whereas a vehicle for larger loads might employ more units. Thus, the number of units can be adjusted according to the load.

Each of the suspension units 34–42 is identical and thus only one is described in detail. With reference to FIG. 3, each unit includes an axle 45, wheels 46 mounted on the axle and including pneumatically inflated rubber tires 47, and a hydraulically expansible and contractible king post 48 interconnecting the axle and the frame 16. This king post includes a cylinder 49 secured to the axle and a piston 50 slidable in the cylinder and connected to the frame by a bracket 51. The cylinder provides a chamber containing hydraulic liquid 53, and the piston has an axial port 54 opening into the chamber. An O-ring 55 surrounds the piston and is in fluid sealing engagement with the piston and the cylinder.

The most significant feature of the present invention is the use of two hydraulic systems 60 and 75 respectively controlling the intermediate and corner suspension units 34–42, so that dynamic loads (for example, wind) are borne by the corner units and the static load (that being carried on the vehicle 15) is borne either entirely or predominantly by the intermediate units. Such division of the loads produces highly advantageous results, as will be explained.

The load supporting or "static" system is generally indicated by the numeral 60 in FIG. 2. This system includes a pump 61 having an inlet connected to a reservoir 62, and an outlet connected to a supply conduit 63 through a manual main control valve 64. The supply conduit has a plurality of branches 66 individually connected to the ports 54 in the king posts 48 of the intermediate suspension units 38, 39, 40, 41 and 42 on both sides of the frame 16. As illustrated in FIG. 3, a manual unit valve 68 is connected in each of these branches of the supply conduit for opening or closing its respective branch. Normally, the unit valves are in open position. The load supporting system also includes a return conduit 69 connected to the juncture of the supply conduit and the main control valve and to the reservoir. A pressure relief valve 70 is connected in the return conduit.

The load leveling or "dynamic" system is generally identified by the numeral 75 in FIG. 2. The leveling system includes a pump 76 having an inlet connected to a reservoir 77 and an outlet connected to a supply duct 78. The supply duct is connected to each of the corner king posts 48 through branches 79, 80, 81 and 82; a normally open manual unit valve 68 is connected in each of these branches. Further, electrically operated supply valves 85, 86, 87 and 88 are connected in the branches, and bypass valves 89 are connected in parallel with the supply valves. Return lines 90, 91, 92 and 93 are connected from the outlet of each supply valve to a sump line 95 that returns to the reservoir 77 through a manually set, normally closed, back pressure control valve 96. Electrically operated release valves 98, 99, 100 and 101 are connected respectively in the return lines. Each of the electrically operated valves is normally closed and includes a solenoid, not shown, that is normally deenergized, but when it is energized, it opens its associated valve. A pressure relief pipe 105 is connected from the outlet of the pump 76 to the reservoir, and a pressure relief valve 106 is connected in this pipe; this relief valve is set above the highest expected operating pressure to protect components, such as hydraulic lines, from excessive pressure.

The load leveling system 75 also has a level sensing unit 110. This unit includes a dish 111 mounted at the intersection of the cross members 22 and containing a pool 113 of mercury. An electrical center contact 114 is connected to the dish and is in electrical contact with the mercury. The dish is mounted in the frame so that this center contact is located at the intersection of imaginary diagonal lines interconnecting the corner units 34–36 and 35–37. The sensing unit also provides electrically conductive right front, left front, left rear, and right rear probes 116, 117, 118 and 119, respectively. Each of these probes is mounted on the dish and projects slightly downward therein. Electrical leads 120 individually interconnect the probes and the electrically operated supply valves 85–88, it being noted that these valves (that is, the solenoids thereof) are grounded, as at 121. Further, an electrical lead 122 connects each supply valve to a release valve 98–101 at the opposite corner of the frame 16; for example, the supply valve 85 is connected to the release valve 101, whereas the supply valve 88 is connected to the release valve 98. A battery 124 is connected by a lead 126 to the center contact 114, and is grounded at 127.

When the frame 16 is level, the pool 113 of mercury does not touch any of the probes 116–119. If the frame tilts down toward the right front corner 25, for example, the pool of mercury moves into contact with the right front probe 116 thereby energizing the right front supply valve 86 and the left rear release valve 100. If the entire front end of the frame drops below the rear end of the frame, both of the front probes 116 and 117 are contacted by the mercury so that both of the front supply valves 85 and 86 and both of the rear release valves 100 and 101 are energized. It is believed evident from this brief explanation how the level sensing unit 110 operates to energize and thereby open the supply and release valves. Although a specific load leveling system has been shown and described, the present invention is not limited to this particular system. The by-pass valves 89 are manual valves that are normally closed but are opened, for example, when it is desired to supply liquid to the corner units 34–37 with the platform in a level position.

Although not shown nor described, a vehicle embodying the present invention would also have provision for being steered, braked, and self-powered or, in the absence of its own power, for being towed.

As previously stated, the subject vehicle 15 is specially useful for transporting a massive rocket generally indicated at 135 (FIG. 1) and its associated umbilical tower 136 which, together with the weight of the frame 16 and the platform 30, constitute the gross load; the weight of such a gross load might be fifteen million pounds. The means for attaching the rocket and tower to the frame is purposely omitted for reasons of clarity. If this were the load to be transported, the number of wheeled units 34–42 would be considerably increased, as previously explained. The number of wheeled units that must be employed is dependent on the gross load and on the capacity of each of the tires 47. That is, the gross load is divided by the maximum allowable operating capacity for each tire, as specified by the tire manufacturer, and the resulting quotient is the number of tires or wheels that are required. Of course, the number of units is one half of this amount, assuming that two wheels are used on each unit. In this regard, it is to be understood that there may be one or more wheels in each suspension unit.

A prime advantage of using one system 60 for the intermediate suspension units 38–42 and an entirely separate system 75 for the corner suspension units 34–37 is maximum utilization of tire capacity. This advantage is best understood by considering how the subject vehicle 15 would be operated for transporting the rocket 135 and tower 136. Thus, in preparing the vehicle to accept the load, the manual main control valve 64 is opened and liquid is pumped from the reservoir 62 into the intermediate king posts 48, partially filling the same, so that when the rocket and the tower are on the platform 30, each of the tires 47 of the intermediate units 38–42 is loaded to a pressure which may be as much as its maximum allowable operating capacity. The actual load, or pressure, on each tire is, of course, determined by the gross static load. The main control valve 64 is then closed to lock a predetermined volume of liquid in the intermediate king posts whose cylinders are, as is believed understood, opened to each other through the branches 66 of the supply conduit 63. The supporting system 60 thus provides a uniform pressure in each intermediate cylinder 49 and a constant liquid volume in the intermediate cylinders and main conduit branches 66 when the valve 64 is closed.

Furthermore, the by-pass valves 89 are opened and liquid is pumped from the reservoir 77 into the corner king posts 48 so as to force the corner tires 47 to accept a share of the gross load. However, each corner tire is not loaded to its maximum operating capacity but is operated at a predetermined base pressure that is somewhat less than the pressure in each of the intermediate tires. The by-pass valves 89 are then closed so that the liquid in each of the corner king posts is locked in by the normally closed supply and release valves 85–88 and 98–101 in addition to the by-pass valves. The back pressure control valve 96 is set to open whenever the pressure on its inlet side (opposite from the side that connects to the reservoir 77) is greater than the base pressure in each of the corner king posts. It is to be noted that the leveling system 75 provides a variable pressure and a controlled liquid volume in each of the corner cylinders 49.

It is thus evident that the gross static load is borne by all of the wheels 46, with the major share of the static load being imposed on the intermediate wheels. Furthermore, this major share of the static load is uniformly distributed on the intermediate wheels whereas the minor share of the static load is uniformly distributed on the corner wheels. Also, the uniformly pressurized liquid in the corner king posts 48 supports the platform 30 in a level position wherein none of the probes 116–119 is in contact with the pool of mercury 113. It is to be understood that the corner wheels need not carry any of the static load, if desired, but they preferably share the static load to reduce the time within which they react to dynamic loads or to tilting of the frame 16.

It is also to be noted that the platform 30 can be raised and lowered by uniformly expanding or contracting all of the cylinders 49. This jacking feature is useful when loading or unloading the vehicle 15.

FIGS. 4, 5, 6 and 7 illustrate typical operating conditions of the vehicle 15 and are now referred to for the purpose of describing how the subject suspension apparatus works under such conditions. In FIG. 4, the condition where the wheels 46 on the right side, for example, of the vehicle 15 travel over a mound 140 in the terrain is illustrated. The right front corner wheels are, of course, the first to encounter the mound, and when they do, the right front corner 25 of the platform 30 rises and the platform declines down toward the left rear corner 27 whereupon the supply valve 87 for the left rear corner king post 48 and the release valve 99 for the right front corner king post are opened. The load leveling pump 76 increases the pressure of the liquid in the left rear corner king post, and the release valve 99 allows liquid, now under pressure greater than the base pressure, from the right front corner king post to return to the reservoir 77. The right front corner is thereby lowered so that the platform is returned to level position. When the right front corner wheels pass the mound, the platform tilts down toward the right front corner whereupon valves 86 and 100 open, the right front corner king post is expanded to return the platform to level position, and the pressure in the left and rear corner king posts returns to the base pressure. As the intermediate wheels successively travel over the mound, liquid from each rising king post is forced into the other intermediate king posts so that the load remains uniformly distributed. As the right rear corner wheels encounter and pass the mound, action similar to that described in regard to initial rise and fall of the right front corner 25 occurs as will be understood.

As the vehicle 15 starts up a slope 142 (FIG. 5) from a lower level 143, the platform 30 tilts toward the rear end, causing the leveling system 75 to increase the pressure of the liquid in the rear corner king posts 48 and to shorten the front corner king posts thereby returning the platform to a level position. As the tires of the intermediate units 38-42 successively encounter the slope, liquid is simply transferred among the intermediate king posts with the load remaining uniformly distributed on the intermediate wheels while the platform remains level. As the vehicle travels onto an upper level 144, from the slope, and the platform tilts forwardly downward, the leveling system returns the platform to a level position, as will be understood.

The condition illustrated in FIG. 6 is similar to the condition in FIG. 4, although the vehicle 15 is shown in end elevation, rather than in side elevation as in FIG. 4. In FIG. 6, however, the entire platform 30 tilts toward the left side causing the leveling system 75 to lower the right side of the platform whereby the platform is returned to a level position.

When the wind blows against the rocket 135 and the tower 136, it exerts a force that tends to upset the vehicle 15 and its load. The load leveling system 75 of the present invention reacts to this dynamic force and automatically levels the platform 30. For example, as illustrated in FIG. 7, the wind force F is directed against the left side of the rocket and tower and initially tilts the platform so that the right side is lower than the left side. The king posts 48 of the right, front and rear corner units 34 and 37 are expanded and the king posts of the left, front and rear corner units 35 and 36 are contracted by the load leveling system causing the platform to return to a level position. As long as the wind force remains, the corner tires 47 on the right side of the vehicle take a greater load than that initially imposed by the static load alone. However, these right corner tires may still not be operating at their maximum allowable full time operating load. Even if they do exceed this allowable load, the application of the wind force is usually of short duration so that the tires will usually be operating within their acceptable short term overload. If the wind force F is expected to last for more than a predetermined duration or to be of greater than predetermined force, the king posts of all of the units 34, 37, and 38-42 can be locked, that is the manual valves 68 can be closed, so that all of the tires on the right side uniformly share the dynamic wind load. Furthermore, the intermediate units 38 and 42 can be connected into the leveling system 75 instead of the supporting system 60 if the dynamic forces are expected to be relatively higher and the static forces are expected to be relatively lower than usual. In other words, the number of suspension units adjacent each corner that operate in the leveling system is dependent on the ratio of the static load to the dynamic load.

Assuming that the wind force F is of a temporary duration and below a predetermined strength, so that the manual valves 68 remain open, then when the wind force diminishes, the platform 30 tilts to the left (FIG. 7). The load leveling system 75 expands the left corner king posts 48 and contracts the right corner king posts bringing the platform 30 back to a level position. The load leveling system reacts to dynamic forces caused by acceleration, deceleration and turning curves in a manner similar to that described in regard to wind forces.

From these examples, it will be observed that during tilting of the platform 30, or relative vertical movement of the intermediate units 38-42 there is simply an interchange of liquid between the intermediate king posts 48, no liquid being added or released. The intermediate tires are never overloaded, that is, never bear more of the load than they were initially given. Furthermore, the total load borne by the intermediate tires is always uniformly distributed therebetween. Thus, the intermediate tires, constituting most of the tires employed on the entire vehicle, can be operated at their maximum allowable load without danger of overloading. On the other hand, since dynamic overloading on the tires 47 of the corner units 34-37 is usually of short duration, the corner tires can be temporarily operated at their allowable short term overload capacity without danger of blowout.

Accordingly, the use of two separate hydraulic systems controlling different groups of wheeled suspension units enables maximum utilization of tire capacity.

It is to be understood that the wheels 46 need not be pneumatic and that the subject suspension apparatus can even be employed with track-laying vehicles. Although the present apparatus protects pneumatic tires, when they are used, it also protects the road being traveled since it uniformly distributes the load over the road and controls the maximum pressure to be applied at any given area of the road.

Although a particular embodiment of the present invention has been shown and described, it will be understood that various changes and modifications may be made in the details thereof without departing from the spirit and scope of the appended claims.

What I claim to be new and desire to secure by Letters Patent is:

1. In a vehicle including a load carrying frame, first and second groups of elevationally adjustable, hydraulic suspension units mounting said frame for earth traversing movement, means for maintaining a substantially constant volume and uniform pressure of liquid in the units of said first group and for allowing liquid to flow freely among the units of said first group whereby the load borne by the units of the first group is uniformly distributed thereamong, and means for varying the pressure and volume of the liquid in the units of said second group so as to maintain said frame in a predetermined attitude.

2. In a vehicle having a platform adapted to support a load, said platform and load being of predetermined weight, first ground engaging hydraulic suspension units supporting said platform and bearing at least the major part of said weight, first means for causing each of said units to exert substantially the same force against said weight irrespective of whether said frame is level or inclined, second ground engaging hydraulic suspension units mounted under said platform, and means operating said second units for automatically leveling said platform.

3. In a vehicle having a platform adapted to support a load, said platform and load being of predetermined weight, first ground engaging hydraulic suspension units supporting said platform and bearing at least the major part of said weight, first means for causing each of said first units to exert substantially the same force against said weight irrespective of whether said frame is level or inclined, second ground engaging hydraulic suspension units mounted under said platform, and means responsive to tilting of said platform for operating said second units to return the platform to a level position.

4. The vehicle of claim 3 wherein there are at least four of said second units located at the corners of a rectangle, and wherein said first units are located between said second units.

5. The vehicle of claim 3 wherein said first and second units include cylinders and pistons, wherein said first means includes a conduit having one end with a plurality of intercommunicating branches individually connected to said first units and an opposite closed end, wherein a predetermined volume of liquid is in said cylinders of the first units and said conduit, and wherein said responsive means includes a source of liquid under pressure individually connected to said second units and level sensing means for causing said liquid source to add liquid to a second unit's cylinder when the platform tilts above such a second unit.

6. The vehicle of claim 3 wherein each suspension unit includes a ground wheel having a pneumatically inflated tire.

7. In a vehicle including a platform for supporting a load to be carried, said platform having opposite ends and opposite sides; a plurality of wheeled hydraulic suspension units positioned under said platform in spaced relation to each other and supporting the platform for earth traversing movement, said plurality of suspension units including a group of corner suspension units and a group of intermediate suspension units, said intermediate units being located between said corner units, said corner units being respectively located relatively adjacent to opposite ends and opposite sides of said platform, each unit having an expandable and contractible, liquid-containing chamber; hydraulic load supporting means interconnecting all of the chambers of said intermediate units for free interchange of lisuid therebetween and for maintaining the total volume of liquid in all of said intermediate chambers substantially constant whereby the total load borne by all of said intermediate units is substantially uniformly distributed among the intermediate units and the pressure of the liquid in said intermediate units remains substantially uniform; and hydraulic load leveling means connected to the chambers of each of said corner units for forcing liquid into or releasing liquid from the corner chambers when their corresponding portions of the platform are at a different elevation from the opposite portions of the platform, whereby if said platform tilts it is returned to level position.

8. In a vehicle including a platform adapted to carry a load and having front and rear corners and an intermediate section, corner and intermediate hydraulic suspension units respectively supporting the corners and the intermediate section of the platform for earth traversing movement, each unit including a ground wheel and a piston and cylinder interconnecting the wheel and the platform, said cylinders containing liquid, conduit means interconnecting all of the cylinders of the intermediate units so that the liquid in the intermediate cylinders is maintained under pressure and so that said conduit means and intermediate cylinders constitute a closed hydraulic circuit whereby contraction of one or more of the intermediate cylinders forces liquid, through said conduit means, into other of the intermediate cylinders; and a level controlling system including means for sensing when the platform tilts out of a level position and hydraulic means interconnecting the cylinders of said corner units and being responsive to said sensing means for forcing liquid into or releasing liquid from the corner cylinder or cylinders under that portion or portions of the platform that is at a different elevation from an opposite portion of the platform, the liquid in said intermediate cylinders being under greater pressure than the liquid in the corner cylinders when said platform is level.

References Cited by the Examiner

UNITED STATES PATENTS

| | | | |
|---|---|---|---|
| 2,128,273 | 8/1938 | Stevens | 280—6.1 |
| 2,229,530 | 1/1941 | South | 280—6 |
| 2,268,017 | 12/1941 | Busick | 280—6.1 |
| 2,310,930 | 2/1943 | Blanchett | 280—6.1 |
| 2,472,944 | 6/1949 | Furer | 280—6.1 |
| 2,934,353 | 4/1960 | D'Avigdor. | |

BENJAMIN HERSH, *Primary Examiner.*

LEO FRIAGLIA, *Examiner.*